United States Patent
Bai

(10) Patent No.: US 10,515,613 B2
(45) Date of Patent: Dec. 24, 2019

(54) METHOD OF PROCESSING IMAGES AND APPARATUS

(71) Applicant: GUANGDONG OPPO MOBILE TELECOMMUNICATIONS CORP., LTD., Dongguan, Guangdong (CN)

(72) Inventor: Jian Bai, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 13 days.

(21) Appl. No.: 15/797,351

(22) Filed: Oct. 30, 2017

(65) Prior Publication Data

US 2018/0268785 A1 Sep. 20, 2018

(30) Foreign Application Priority Data

Mar. 16, 2017 (CN) .......................... 2017 1 0156940

(51) Int. Cl.
*G09G 5/395* (2006.01)
*G06F 16/51* (2019.01)

(52) U.S. Cl.
CPC ............. *G09G 5/395* (2013.01); *G06F 16/51* (2019.01); *G09G 2340/02* (2013.01)

(58) Field of Classification Search
CPC .... G09G 5/395; G09G 2340/02; H04N 19/30; H04N 19/46; H04N 19/60; G06F 16/51
USPC .................................................. 382/166, 232
See application file for complete search history.

(56) References Cited

U.S. PATENT DOCUMENTS

| | | | |
|---|---|---|---|
| 6,310,647 B1 * | 10/2001 | Parulski | H04N 1/2112 348/231.99 |
| 7,038,735 B2 | 5/2006 | Coleman | |
| 7,298,094 B2 | 11/2007 | Yui | |
| 7,639,265 B2 * | 12/2009 | Evans | H04N 19/61 345/589 |
| 2001/0033286 A1 * | 10/2001 | Stokes | H04N 1/64 345/590 |
| 2003/0128299 A1 | 7/2003 | Coleman et al. | |
| 2007/0145903 A1 | 6/2007 | Yui | |
| 2010/0281070 A1 | 11/2010 | Chan | |
| 2014/0006564 A1 | 1/2014 | Thang | |

(Continued)

FOREIGN PATENT DOCUMENTS

CN 101600204 A 12/2009
CN 103493499 A 1/2014
(Continued)

OTHER PUBLICATIONS

Supplementary European Search Report in European application No. 17202156.0, dated Jun. 1, 2018.
(Continued)

*Primary Examiner* — Jacinta M Crawford

(57) ABSTRACT

In a method of processing images and an apparatus of the present disclosure, a mobile terminal obtains a storage file of a target image, where the storage file includes a plurality of file blocks and precision information of an image display system that is suitable for the file blocks. The mobile terminal obtains reference precision of the image display system for determining that at least one file block is suitable for the reference precision in the storage file. The mobile terminal further displays the target image according to the at least one determined file block.

12 Claims, 11 Drawing Sheets

(56) References Cited

U.S. PATENT DOCUMENTS

2016/0353123 A1 12/2016 Ninan
2018/0109581 A1 4/2018 Thang et al.

FOREIGN PATENT DOCUMENTS

| CN | 105139792 A | 12/2015 |
| CN | 105607886 A | 5/2016 |
| CN | 105900421 A | 8/2016 |
| CN | 106961612 A | 7/2017 |
| EP | 2924989 A1 | 9/2015 |
| WO | 2010126451 A1 | 11/2010 |
| WO | 2015105790 A1 | 7/2015 |

OTHER PUBLICATIONS

Greg Ward et al: "JPEG-HDR: A backwards-Compatible, high Dynamic Range Extension to JPEG", International Conference on Computer Graphics and Interactive Techniques, ACM SIGGRAPH 2006 Papers, Boston, Massachusetts, ACM, New York, NY, USA, Jul. 30, 2006 (Jul. 30, 2006), pp. 3-es, XP058118842, DOI: 10.1145/1185657.1185685 ISBN: 978-1-59593-364-5 *the whole document *.
Written Opinion and International Search Report dated Feb. 13, 2018, issued in corresponding International Application No. PCT/CN2017/114672, citing the above reference(s).

* cited by examiner

FIG. 4

| first file block | second file block | ● ● ● | (N-1)th file block | Nth file block |

METHOD OF PROCESSING IMAGES AND APPARATUS

CROSS REFERENCE TO RELATED APPLICATION

This application claims priority to Chinese Patent Application No. 201710156940.3, filed on Mar. 16, 2017 and entitled "METHOD OF PROCESSING IMAGES AND APPARATUS" applied by GUANGDONG OPPO MOBILE TELECOMMUNICATIONS CORP., LTD. The entire disclosure of the above application is incorporated herein by reference.

BACKGROUND

Field

The present disclosure relates to a technical field of mobile terminals, and more particularly to a method of processing images and an apparatus.

Background

Currently, in image file storage media, an image format that is compatible with Joint Photographic Experts Group (JPEG) format, has characteristics of a large image compression ratio and small image quality loss. Image compression and storage are performed based on a YUV format having an 8-bit width, where Y is defined as measurements, and U and V are defined as chrominance.

With rapid developments of display technology and increasing user requirements of displayed, higher demands of image quality are urgent, so that more bit width (e.g., 10-bit, or 12-bit width) need to be used, to store and express brightness and color information of images. Conventional YUV and RGB formats in an image system will still exist for a long period of time, where the RGB format is represented by red, green and blue colors, and has an 8-bit width per variable.

Therefore, a backward compatible file storage system is necessary. On one hand, in a conventional display system having 8-bit width, proper display of an image file storage format is needed, and can completely avoid any improper influence. On the other hand, when the display system, including display driving units and display units, supports high precision display, high-precision data can be analyzed from an image file, and thus, high-quality display can be carried out.

BRIEF DESCRIPTION OF THE DRAWINGS

FIG. 4 illustrates a structural diagram of a storage file of target images according to one embodiment of the present disclosure.

DETAILED DESCRIPTION OF THE PREFERRED EMBODIMENTS

Figure 1:
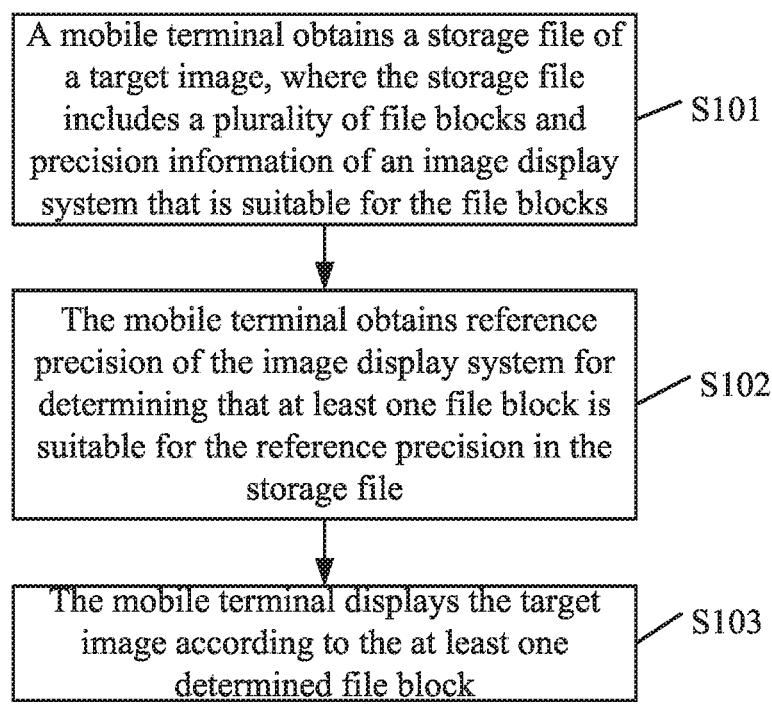
FIG. 1 is an illustrative flowchart of a method of displaying images according to one embodiment of the present disclosure.

The following embodiments refer to the accompanying drawings for exemplifying specific implementable embodiments of the present disclosure in a suitable computing environment. It should be noted that the exemplary described embodiments are configured to describe and understand the present disclosure, but the present disclosure is not limited thereto.

In the descriptions of the present disclosure, the terms "center", "longitudinal", "lateral", "length", "width", "thickness", "upper", "lower", "front", "back", "left", "right", "vertical", "horizontal", "top", "bottom", "inner", "outer", "clockwise", "counterclockwise" directions, and other indicated directions or the position relation are based on the orientation or position relation shown in the figures. Only for convenience of describing the present disclosure and the simplification of the description, rather than indicating or implying that the means or elements referred to have a specific orientation, so that the above directions of the present disclosure cannot be understood as limitations. In addition, the terms "first" and "second" are used only for purposes of description, and cannot be understood to indicate or imply a relative importance or to implicitly indicate the number of technical features indicated. Thus, the features "first" and "second" can be expressly or implicitly included in one or more of the features. In the description of the present disclosure, the meanings of "multiple" are two or more, unless specifically limited otherwise.

In the descriptions of the present disclosure, it should be noted that unless explicitly stated and defined otherwise, the terms "installing", "connecting", and "connecting" should be construed broadly. For example, the connecting device can be fixedly connected, detachably connected, mechanically connected, electrically connected, in mutual communication with each other, directly connected or indirectly connected through an intermediate medium. The interaction relationship between the two elements in the two elements can be the interaction relationship of the two elements. For a person of ordinary skill in the art, the specific meaning of the terms in the present disclosure can be understood according to specific situations.

In the present disclosure, unless explicitly stated and defined otherwise, the first feature can be in direct contact with the first feature if the first feature is arranged "on" or "under" the second feature. The first and second features may also include first and second features that are not in direct contact but are in contact with each other through additional features. That the first feature is "above" the second feature mean that the first feature is arranged right above or obliquely upward the second feature. Also, only the height of the first feature is greater than that of the second feature. That the first feature is "below" the second feature mean that the first feature is arranged right below or obliquely downward the second feature. Also, only the height of the first feature is less than that of the second feature.

The following disclosure provides many different embodiments or examples for implementing different structures of the present disclosure. In order to simplify the disclosure of the present disclosure, components and arrangements of specific examples are described below. It should be noted that they are merely examples and are not intended to limit the present disclosure. In addition, reference numerals and/or reference letters can be repeated in different examples. The repetition is for the purpose of simplicity and clarity and does not means the relationship between the various embodiments and/or arrangements discussed. In addition, the present disclosure provides examples of various specific processes and materials. The other processes and/or the use of other materials can be recognized by person skilled in the art.

In embodiments of the present disclosure, a mobile terminal is selected from a group consisting of various handheld devices having wireless communication functions, vehicle-mounted equipment, a wearable device, a computing device, processing equipment connected to a wireless modulation device, various types of user equipment (UE), a mobile station (MS), and a terminal device. For convenience of descriptions, the above-mentioned devices are collectively referred to mobile terminals.

A storage file of a joint photographic experts group (JPEG) includes two parts of data (i.e., mark codes and compression data). Each of the mark codes has two bytes, where the previous byte is a fixed value 0xFF, and the last byte includes different values based on different definitions. In one embodiment, before each mark code, arbitrary number of values 0xFF can be added. In other words, a plurality of consecutive non-significance values 0xFF can be regarded as one value 0xFF that represents a start point of each mark code. A stream of the compression data corresponding to the mark code is arranged after the mark code having a length of two bytes. The compression data stream is configured to record various information of the storage file. The mark codes include following various types.

1. Start of image (SOI) represents a start point of image data, and is started by a code 0xFFD8 having two bytes.

2. End of image (EOI) represents an end point of image data, and is started by a code 0xFFD9 having two bytes.

3. App0-15 represent information of image data lengths and a number of pixels, and are started by codes 0xFFE0 to 0xFFFF.

4. DQT represents a quantization table, and is started by a code 0xFFDB.

5. DHT represents a Huffman coding table, and is started by a code 0xFFC4.

6. Start of frame (SOF) represents a start point of a frame, and is started by a code 0xFFC0.

7. Start of scan (SOC) represents a start point of a scan procedure, and is started by a code 0xFFDA.

8. Define restart interval (DRI) represents a differential coding accumulative reset, and is started by a code 0xFFDD.

In one embodiment, SOI is a name of the mark code. In an image file, the mark codes are represented by a format of mark code values. For example, a mark code value of SOI is represented as 0xFFD8. In other words, if the value 0xFFD8 appears in a location of a JPEG image file, this location can be marked as SOI.

Therefore, if a value 0xFF exists in the compression data stream (i.e., real image information), the value 0xFF needs to be processed. For example, if the data stream includes value 0xFF, a next character of the value 0xFF needs to be detected, and includes one of following values.

(1) If the next character of the value 0xFF is represented as a value 0x00, the code 0xFF is part of the image data stream, and needs to be decoded.

(2) If the next character of the code 0xFF is represented as code 0xD8, a combination of values 0xFF and 0xD9 is regarded as an end of the image data stream, and is used to define an end of the image file.

(3) If the next character of the value 0xFF is represented as one of values 0xD0-0xD7, combinations of the value 0xFF and each of the values 0xD0-0xD7 represent RSTn marks, and the RSTn marks can be ignored. In other words, the values 0xFF and 0xDn having the length of two bytes do not need to be decoded. Variables of the decoded codes are adjusted based on rules of RSTn marks.

(4) If the next character of the value 0xFF is represented as a value 0xFF, a previous value 0xFF can be ignored and the next value 0xFF is determined.

(5) If the next character of the code 0xFF is represented as other values, a previous value 0xFF can be ignored, and the next value after the value 0xFF is retained for decoding.

According to above-mentioned descriptions, a JEPG image file format in related art does not consider the requirements of various qualities. The embodiments of the present disclosure are described in the following with reference to the accompanying drawings.

FIG. 1 is an illustrative flowchart of a method of displaying images according to one embodiment of the present disclosure. For example, the method is used in a mobile terminal, and includes following action blocks.

At block S101, a mobile terminal obtains a storage file of a target image, where the storage file includes a plurality of file blocks and precision information of an image display system that is suitable for the file blocks.

The precision information refers to a bit width of the data of the file blocks suitable for being processed by the image display system. The data in the file blocks are used for storing and displaying brightness and color information of images, where a larger bit width corresponds to higher quality of the displayed image.

A storage format of each file block includes a mark code and a compression data. Start of the storage file is a first file block, and the first file block is still a traditional 8-bit storage format of a JPEG image file, where the first file block is started by a mark code SOI and ended with a mark code EOI. An image file processing system compresses, encodes and stores image data of the target image based on 8-bit width precision for obtaining the compression data of the first file block. The image data includes brightness and chromaticity of the pixels of the target image, where the first file block is completely compatible with the JPEG format.

After the first file block, the storage file further includes a second file block, a third file block, and a Nth file block, where N is an integer greater than one. The mark code in the storage format of the Nth file block can use the mark code in the original JPEG format. A new mark code can also be set. For example, a value 0xFFD7 is set as a start of new image (SONI).

At block S102, the mobile terminal obtains reference precision of the image display system for determining that at least one file block is suitable for the reference precision in the storage file. In one embodiment, obtaining reference precision for determining that at least one file block is suitable for the reference precision in the storage file includes following action. The reference precision is defined as a preset bit width of an image display system itself, such that an image can be properly displayed on the image display system based on the preset bit width.

The mobile terminal uses the reference precision as a query identifier, inquires the precision information of the image display system which is applicable to the file blocks in the storage file, and determines at least one file block suitable for the reference precision. For example, the reference precision corresponds to a preset bit width is selected from a group consisting of 8-bit width, 10-bit width, 12-bit width, and the like.

At block S103, the mobile terminal displays the target image according to the at least one determined file block. In one embodiment, displaying the target image according to the at least one determined file block includes following action.

The mobile terminal decodes the determined file block according to the reference precision for obtaining reference precision data of the target image, and displays the target image according to the reference precision data.

According to above-mentioned descriptions, in embodiments of the present disclosure, the mobile terminal firstly obtains the storage file of the target image. The mobile terminal then obtains the reference precision of the image display system for determining that at least one file block is suitable for the reference precision in the storage file. Finally, the mobile terminal displays the target image according to the at least one determined file block. Since the storage file of the target image includes a plurality of file blocks and the precision information of the image display system that is used by the file blocks, so that the storage file can be compatible with an image display system having various precision information, thereby improving compatibility of the target image.

In one embodiment, the plurality of file blocks includes at least one first file block and a second file block, where the first file block is suitable for the image display system having a first precision, the second file block is suitable for the image display system having a second precision. The second precision is higher than (i.e., better than) the first precision, and the first file block is followed by the second file block.

The second file block includes mark codes and compression data.

The second file block can be used for a high-precision image display system to display the target image according to the second precision. The storage format of the second file block is a storage format of a JPEG image file, so that compatibility of the storage file and convenience of an image display are improved.

In embodiments of the present disclosure, the mark codes of the second file block is a type selected from a group consisting of mark codes SOI, EOI, App0-15, DQT, DHT, SOF, SOC, DRI, and SONI. The mark code SONI is represented by a code 0xFFD7.

In one embodiment, the mark code of the second file block can use mark code of the storage format of the JPEG image file. The second file block can also use a new mark code according to another embodiment of the present disclosure.

In one embodiment, the compression data in the second file block are high-precision information of compression data in the first file block.

In one embodiment, the high-precision information includes a plurality of data segments, and each of the data segments includes relative brightness data or relative chromaticity data of pixels. The relative brightness data is a difference value or a relative value of the brightness of the adjacent pixels, and the chromaticity relative data is the difference value or the relative value of the chromaticity of the adjacent pixels.

In embodiments, the relative value can be represented by how many multiples larger than an integer, or the relative value can also be represented by how many multiples smaller than a negative number.

For example, brightness of a first pixel of the segment data is a value 120, and brightness of a second pixel is a value 60, so that the second pixel is correspondingly encoded as a negative value −2. If brightness of a third pixel is a value 1200, the third pixel is correspondingly encoded as a value +12. In one embodiment, the pixels are encoded by a unit of a block. A specific value of the first pixel is stored in a first position of each block, and the values stored in adjacent positions are the encoded values correspondingly. For example, when a matrix 8*8 of a pixel block is encoded, the matrix 8*8 is a matrix array 8*8, where a left upper position of the matrix array 8*8 is defined as the first position and is configured to store original value, and the rest of the positions in the matrix array 8*8 are configured to store relative values of the rest of the positions corresponding to the original value of the first position.

In embodiments of the present disclosure, the compression data is relative values stored in the second file block. When the storage file is processed by operations, such as gamma correction, and since the relative values of the brightness or the chromaticity of the pixels in each data segment are not greatly changed along with the change of the processed operations, the compression data in the file block can be kept unchanged, so that only the first file block needs to be processed. Therefore, complexity of image processing is simplified, and image processing efficiency is improved.

In addition, since the compression data in the second file block are encoded according to the aforementioned encoding manner, a coding bit width can be shortened. For example, more than 8-bit data (e.g., brightness value 1024) corresponds to a smaller relative value, and the brightness value 1024 can be encoded by 8-bit width and even less bits, so that the requirement of the storage file of the image on the storage capacity can be reduced.

In one embodiment, the first file block in the plurality of file blocks is a JPEG image file, where the first file block is suitable for an image display system having an 8-bit width.

Therefore, the storage file of the target image is still compatible with the original 8-bit width of JPEG format.

Figure 2:
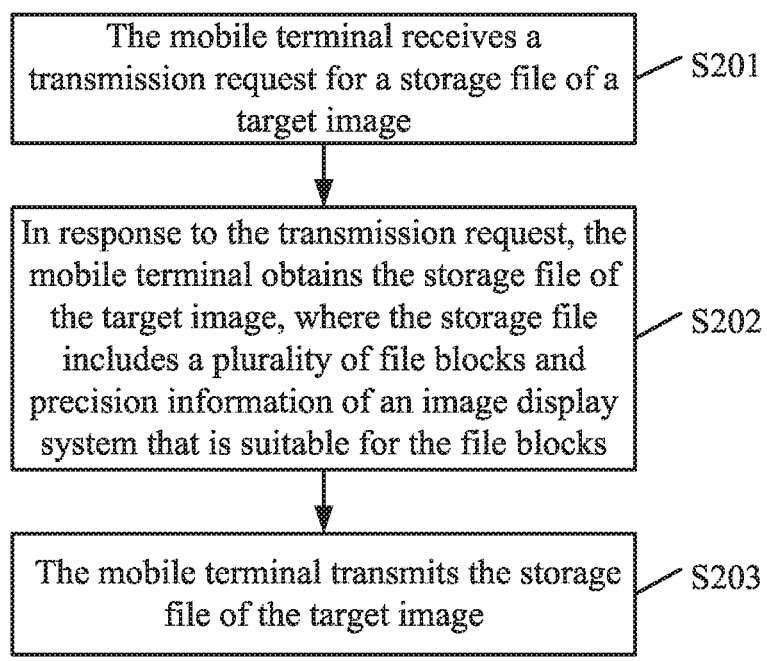
FIG. 2 is an illustrative flowchart of a method of transmitting images according to one embodiment of the present disclosure.

Consistent with the embodiments in FIG. 1, FIG. 2 is an illustrative flowchart of a method of transmitting images according to one embodiment of the present disclosure. As shown in FIG. 2, for example, the method is used in a mobile terminal, and includes following action blocks.

At block S201, the mobile terminal receives a transmission request for a storage file of a target image.

At block S202, in response to the transmission request, the mobile terminal obtains the storage file of the target image, where the storage file includes a plurality of file blocks and precision information of an image display system that is suitable for the file blocks.

The precision information refers to a bit width of the data of the file blocks suitable for being processed by the image display system. The data in the file blocks are used for storing and displaying brightness and color information of images, where a larger bit width corresponds to higher quality of the displayed image.

At block S203, the mobile terminal transmits the storage file of the target image.

According to above-mentioned descriptions, in embodiments of the present disclosure, the mobile terminal firstly receives the transmission request for the storage file of the target image. The mobile terminal obtains the storage file of the target image in response to the transmission request. Finally, the mobile terminal transmits the storage file of the target image. Since the storage file of the target image includes a plurality of file blocks and the precision information of the image display system that is used by the file blocks, so that the storage file can be compatible with an image display system having various precision information, thereby improving compatibility of the target image.

In embodiments of the present disclosure, the mark codes of the second file block is a type selected from a group consisting of mark codes SOI, EOI, App0-15, DQT, DHT, SOF, SOC, DRI, and SONI. The mark code SONI is represented by a code 0xFFD7.

In one embodiment, the mark code of the second file block can use mark code of the storage format of the JPEG image file. The second file block can also use a new mark code according to another embodiment of the present disclosure.

In one embodiment, the compression data in the second file block are high-precision information of compression data in the first file block.

In one embodiment, the high-precision information includes a plurality of data segments, and each of the data segments includes relative brightness data or relative chromaticity data of pixels. The relative brightness data is a difference value or a relative value of the brightness of the adjacent pixels, and the chromaticity relative data is the difference value or the relative value of the chromaticity of the adjacent pixels.

In embodiments, the relative value can be represented by how many multiples larger than an integer, or the relative value can also be represented by how many multiples smaller than a negative number.

For example, brightness of a first pixel of the segment data is a value 120, and brightness of a second pixel is a value 60, so that the second pixel is correspondingly encoded as a negative value −2. If brightness of a third pixel is a value 1200, the third pixel is correspondingly encoded as a value +12. In one embodiment, the pixels are encoded by a unit of a block. A specific value of the first pixel is stored in a first position of each block, and the values stored in adjacent positions are the encoded values correspondingly. For example, when a matrix 8*8 of a pixel block is encoded, the matrix 8*8 is a matrix array 8*8, where a left upper position of the matrix array 8*8 is defined as the first position and is configured to store original value, and the rest of the positions in the matrix array 8*8 are configured to store relative values of the rest of the positions corresponding to the original value of the first position.

In embodiments of the present disclosure, the compression data is relative values stored in the second file block. When the storage file is processed by operations, such as gamma correction, and since the relative values of the brightness or the chromaticity of the pixels in each data segment are not greatly changed along with the change of the processed operations, the compression data in the file block can be kept unchanged, so that only the first file block needs to be processed. Therefore, complexity of image processing is simplified, and image processing efficiency is improved.

In addition, since the compression data in the second file block are encoded according to the aforementioned encoding manner, a coding bit width can be shortened. For example, more than 8-bit data (e.g., brightness value 1024) corresponds to a smaller relative value, and the brightness value 1024 can be encoded by 8-bit width and even less bits, so that the requirement of the storage file of the image on the storage capacity can be reduced.

In one embodiment, the first file block in the plurality of file blocks is a JPEG image file, where the first file block is suitable for an image display system having an 8-bit width.

Therefore, the storage file of the target image is still compatible with the original 8-bit width of JPEG format.

Figure 3:
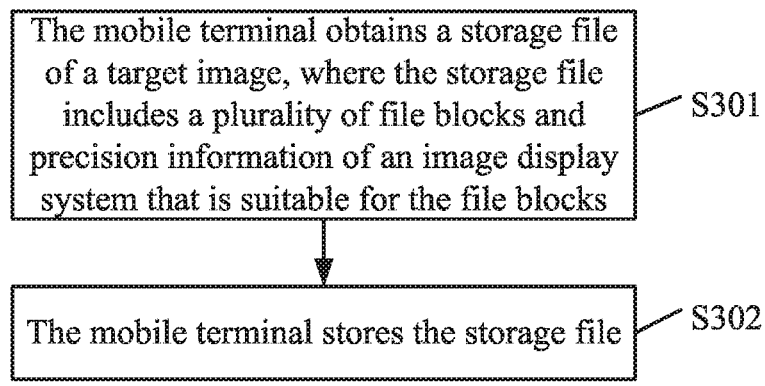
FIG. 3 is an illustrative flowchart of a method of storing images according to one embodiment of the present disclosure.

Consistent with the embodiments in FIG. 1, FIG. 3 is an illustrative flowchart of a method of storing images according to one embodiment of the present disclosure. As shown in FIG. 3, for example, the method is used in a mobile terminal, and includes following action blocks.

At block S301, the mobile terminal obtains a storage file of a target image, where the storage file includes a plurality of file blocks and precision information of an image display system that is suitable for the file blocks. The precision information refers to a bit width of the data of the file blocks suitable for being processed by the image display system. The data in the file blocks are used for storing and displaying brightness and color information of images, where a larger bit width corresponds to higher quality of the displayed image.

At block S302, the mobile terminal stores the storage file.

According to above-mentioned descriptions, in embodiments of the present disclosure, the mobile terminal firstly obtains the storage file of the target image. The mobile terminal then stores the storage file. Since the storage file of the target image includes a plurality of file blocks and the precision information of the image display system that is used by the file blocks, so that the storage file can be compatible with an image display system having various precision information, thereby improving compatibility of the target image.

In embodiments of the present disclosure, the mark codes of the second file block is a type selected from a group consisting of mark codes SOI, EOI, App0-15, DQT, DHT, SOF, SOC, DRI, and SONI. The mark code SONI is represented by a code 0xFFD7.

In one embodiment, the mark code of the second file block can use mark code of the storage format of the JPEG image file. The second file block can also use a new mark code according to another embodiment of the present disclosure.

In one embodiment, the compression data in the second file block are high-precision information of compression data in the first file block.

In one embodiment, the high-precision information includes a plurality of data segments, and each of the data segments includes relative brightness data or relative chromaticity data of pixels. The relative brightness data is a difference value or a relative value of the brightness of the adjacent pixels, and the chromaticity relative data is the difference value or the relative value of the chromaticity of the adjacent pixels.

In embodiments, the relative value can be represented by how many multiples larger than an integer, or the relative value can also be represented by how many multiples smaller than a negative number.

For example, brightness of a first pixel of the segment data is a value 120, and brightness of a second pixel is a value 60, so that the second pixel is correspondingly encoded as a negative value −2. If brightness of a third pixel is a value 1200, the third pixel is correspondingly encoded as a value +12. In one embodiment, the pixels are encoded by a unit of a block. A specific value of the first pixel is stored in a first position of each block, and the values stored in adjacent positions are the encoded values correspondingly. For example, when a matrix 8*8 of a pixel block is encoded, the matrix 8*8 is a matrix array 8*8, where a left upper position of the matrix array 8*8 is defined as the first position and is configured to store original value, and the rest of the positions in the matrix array 8*8 are configured to store relative values of the rest of the positions corresponding to the original value of the first position.

In embodiments of the present disclosure, the compression data is relative values stored in the second file block. When the storage file is processed by operations, such as gamma correction, and since the relative values of the brightness or the chromaticity of the pixels in each data segment are not greatly changed along with the change of the processed operations, the compression data in the file block can be kept unchanged, so that only the first file block needs to be processed. Therefore, complexity of image processing is simplified, and image processing efficiency is improved.

In addition, since the compression data in the second file block are encoded according to the aforementioned encoding manner, a coding bit width can be shortened. For example, more than 8-bit data (e.g., brightness value 1024) corresponds to a smaller relative value, and the brightness value 1024 can be encoded by 8-bit width and even be a smaller bit width, so that the requirement of the storage file of the image on the storage capacity can be reduced.

In one embodiment, the first file block in the plurality of file blocks is a JPEG image file, where the first file block is suitable for an image display system having an 8-bit width.

Therefore, the storage file of the target image is still compatible with the original 8-bit width of JPEG format.

Consistent with the embodiments in FIG. 1, FIG. 4 illustrates a structural diagram of a storage file of target images according to one embodiment of the present disclosure. The storage file of the target images includes a plurality of file blocks and precision information of an image display system that is suitable for the file blocks. The file blocks in FIG. 4 further includes a first file block, a second file block, a third file block, a (N−1)th file block, and a Nth file block, where N is an integer greater than one.

The precision information refers to a bit width of the data of the file blocks suitable for being processed by the image display system. The data in the file blocks are used for storing and displaying brightness and color information of images, where a larger bit width corresponds to higher quality of the displayed image.

A storage format of each file block includes a mark code and a compression data. Start of the storage file is a first file block, and the first file block is still a traditional 8-bit storage format of a JPEG image file, where the first file block is started by a mark code SOI and ended with a mark code EOI. An image file processing system compresses, encodes and stores image data of the target image based on 8-bit width precision for obtaining the compression data of the first file block. The image data includes brightness and chromaticity of the pixels of the target image, where the first file block is completely compatible with the JPEG image file.

After the first file block, the storage file further includes a second file block, a third file block, and a Nth file block, where N is an integer greater than one. The mark code in the storage format of the Nth file block can use the mark code in the original JPEG format. A new mark code can also be set. For example, a value 0xFFD7 is set as a start of new image (SONI).

According to above-mentioned descriptions, in embodiments of the present disclosure, terminal displays the target image according to the at least one determined file block. Since the storage file of the target image includes a plurality of file blocks and the precision information of the image display system that is used by the file blocks, so that the storage file can be compatible with an image display system having various precision information, thereby improving compatibility of the target image.

In embodiments of the present disclosure, the mark codes of the second file block is a type selected from a group consisting of mark codes SOI, EOI, App0-15, DQT, DHT, SOF, SOC, DRI, and SONI. The mark code SONI is represented by a code 0xFFD7.

In one embodiment, the mark code of the second file block can use mark code of the storage format of the JPEG image file. The second file block can also use a new mark code according to another embodiment of the present disclosure.

In one embodiment, the compression data in the second file block are high-precision information of compression data in the first file block.

In one embodiment, the high-precision information includes a plurality of data segments, and each of the data segments includes relative brightness data or relative chromaticity data of pixels. The relative brightness data is a difference value or a relative value of the brightness of the adjacent pixels, and the chromaticity relative data is the difference value or the relative value of the chromaticity of the adjacent pixels.

In embodiments, the relative value can be represented by how many multiples larger than an integer, or the relative value can also be represented by how many multiples smaller than a negative number.

For example, brightness of a first pixel of the segment data is a value 120, and brightness of a second pixel is a value 60, so that the second pixel is correspondingly encoded as a negative value −2. If brightness of a third pixel is a value 1200, the third pixel is correspondingly encoded as a value +12. In one embodiment, the pixels are encoded by a unit of a block. A specific value of the first pixel is stored in a first position of each block, and the values stored in adjacent positions are the encoded values correspondingly. For example, when a matrix 8*8 of a pixel block is encoded, the matrix 8*8 is a matrix array 8*8, where a left upper position of the matrix array 8*8 is defined as the first position and is configured to store original value, and the rest of the positions in the matrix array 8*8 are configured to store relative values of the rest of the positions corresponding to the original value of the first position.

In embodiments of the present disclosure, the compression data is relative values stored in the second file block. When the storage file is processed by operations, such as gamma correction, and since the relative values of the brightness or the chromaticity of the pixels in each data segment are not greatly changed along with the change of the processed operations, the compression data in the file block can be kept unchanged, so that only the first file block needs to be processed. Therefore, complexity of image processing is simplified, and image processing efficiency is improved.

In addition, since the compression data in the second file block are encoded according to the aforementioned encoding manner, a coding bit width can be shortened. For example, more than 8-bit data (e.g., brightness value 1024) corresponds to a smaller relative value, and the brightness value 1024 can be encoded by 8-bit width and even be a smaller bit width, so that the requirement of the storage file of the image on the storage capacity can be reduced.

In one embodiment, the first file block in the plurality of file blocks is a JPEG image file, where the first file block is suitable for an image display system having an 8-bit width.

Therefore, the storage file of the target image is still compatible with the original 8-bit width of JPEG format.

According to the above-mentioned embodiments, the present disclosure focuses on implements of the methods. In order to achieve the implements, the mobile terminal includes hardware or software units that execute corresponding functions. Persons skilled in the art should be noted that, in combination with units and algorithms, the present disclosure can be performed by hardware and a combination of the hardware and computerized software. Whether a certain function is executed by the hardware or the computerized software is used for driving the hardware, depends on applications and design conditions of technical schemes. Persons skilled in the art can use different methods for each specific application to achieve the described functions, but the implementations are not considered to be beyond the scope of the present disclosure.

Embodiments of the present disclosure can perform functional units of the mobile terminal according to the method. For example, each functional unit can be divided into various functions, or two or more functional units can also be integrated in a processing unit. The integrated unit can be implemented in a hardware, and can also be implemented in the form of software functional units. It should be noted that the division of the functional units is illustrative, and is a logic function division. In an actual implementation, different division modes can be achieved.

Figure 5A:
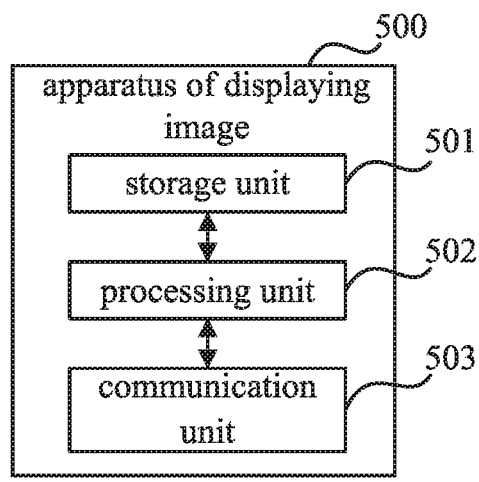
FIG. 5A illustrates a structural diagram of an apparatus of displaying images according to one embodiment of the present disclosure.

If integration units are used, FIG. 5A illustrates a structural diagram of an apparatus of displaying images according to one embodiment of the present disclosure. The apparatus 500 of displaying images includes a processing unit 502 and a communication unit 503. The processing unit 502 is configured to control actions of the image display apparatus 500. For example, the processing unit 502 is configured to support the image display apparatus 500 that performs action blocks S101 to S103 in FIG. 1, and other related actions of present disclosure. The image display apparatus 500 further includes a storage unit 501 for storing computerized program codes and data of the image display apparatus 500.

In one embodiment, the processing unit 502 is a processor or a controller, and is selected from a group consisting of a central processing unit (CPU), a digital signal processor (DSP), an application specific integrated circuit (ASIC), a field programmable gate array (FPGA) or programmable logic devices, discrete gates, transistor logic devices, discrete hardware components, and the combinations. The processing unit 502 can implement various exemplary logical action blocks and circuits of the present disclosure. The processor can also be a combination for performing calculation functions, such as a combination of one or more microprocessors, a combination of a DSP and a microprocessor, and the like. The communication unit 503 is selected from a group consisting of a communication interface, a transceiver, and a transceiving circuit, where the communication interface is collectively referred to at least one interface. The storage unit 501 can be a memory.

The processing unit 502 obtains a storage file of a target image using the communication unit 503, where the storage file includes a plurality of file blocks and precision information of an image display system that is suitable for the file blocks. The processing unit 502 further obtains reference precision of the image display system for determining that at least one file block is suitable for the reference precision in the storage file. The processing unit 502 also displays the target image according to the at least one determined file block.

In one embodiment, the plurality of file blocks includes at least one first file block and a second file block, where the first file block is suitable for a first precision image display system, the second file block is suitable for a second precision image display system. The second precision is higher than (i.e., better than) the first precision, and the first file block is followed by the second file block.

The second file block includes mark codes and compression data.

In embodiments of the present disclosure, the mark codes of the second file block is a type selected from a group consisting of mark codes SOI, EOI, App0-15, DQT, DHT, SOF, SOC, DRI, and SONI. The mark code SONI is represented by a code 0xFFD7.

In one embodiment, the compression data in the second file block are high-precision information of compression data in the first file block.

In one embodiment, the high-precision information includes a plurality of data segments, and each of the data segments includes relative brightness data or relative chromaticity data of pixels. The relative brightness data is a difference value or a relative value of the brightness of the adjacent pixels, and the chromaticity relative data is the difference value or the relative value of the chromaticity of the adjacent pixels.

In one embodiment, the first file block in the plurality of file blocks is a JPEG image file, where the first file block is suitable for an image display system having an 8-bit width.

Figure 5B:
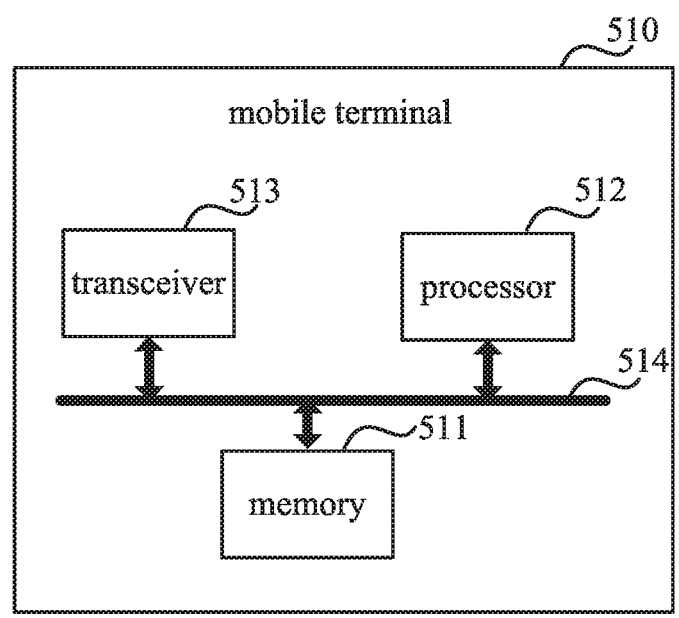
FIG. 5B illustrates a structural diagram of a mobile terminal according to one embodiment of the present disclosure.

In one embodiment, when the processing unit 502 is a processor, the communication unit 503 is a communication interface, and the storage unit 501 is a memory, the image display apparatus includes the mobile terminal in FIG. 5B.

As shown in FIG. 5B, the mobile terminal 510 includes a processor 512, a transceiver 513, and memory 511. The mobile terminal 510 further includes a bus 514. The processor 512 is connected with the transceiver 513 and the memory 511 using the bus 514. For example, the bus 514 can be a peripheral component interconnect (PCI) bus or an extended industry standard architecture (EISA) bus, and the like. The bus 514 includes an address bus, a data bus, and a control bus. In FIG. 5B, only one thick line is used to represent the bus 514, but not only one bus or one type of bus can be represented.

The image display apparatus in FIG. 5A can also be a device arranged in the mobile terminal.

Figure 6A:
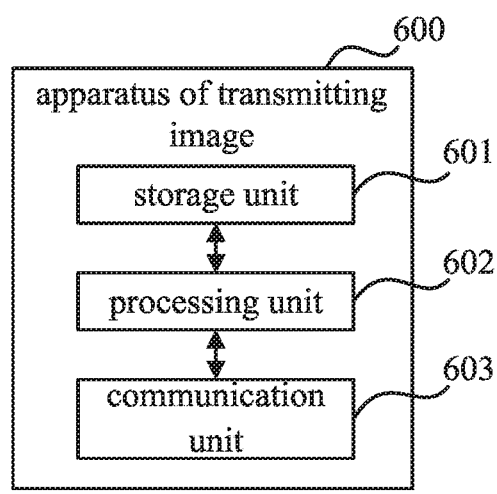
FIG. 6A illustrates a structural diagram of an apparatus of transmitting images according to one embodiment of the present disclosure.

If integration units are used, FIG. 6A illustrates a structural diagram of an apparatus of transmitting images according to one embodiment of the present disclosure. The apparatus 600 of transmitting images includes a processing unit 602 and a communication unit 603. The processing unit 602 is configured to control actions of the image transmission apparatus 600. For example, the processing unit 602 is configured to support the image transmission apparatus 600 that performs action blocks S201 to S203 in FIG. 2, and other related actions of present disclosure. The image transmission apparatus 600 further includes a storage unit 601 for storing computerized program codes and data of the image transmission apparatus 600.

In one embodiment, the processing unit 602 is a processor or a controller, and is selected from a group consisting of a central processing unit (CPU), a digital signal processor (DSP), an application specific integrated circuit (ASIC), a field programmable gate array (FPGA) or programmable logic devices, discrete gates, transistor logic devices, discrete hardware components, and the combinations. The processing unit 602 can implement various exemplary logical action blocks and circuits of the present disclosure. The processor can also be a combination for performing calculation functions, such as a combination of one or more microprocessors, a combination of a DSP and a microprocessor, and the like. The communication unit 603 is selected from a group consisting of a communication interface, a transceiver, and a transceiving circuit, where the communication interface is collectively referred to at least one interface. The storage unit 601 can be a memory.

The processing unit 602 receives a transmission request for a storage file of a target image using the communication unit 603. The processing unit 602 further in response to the transmission request, the mobile terminal obtains the storage file of the target image, where the storage file includes a plurality of file blocks and precision information of an image display system that is suitable for the file blocks. The processing unit 602 also transmits the storage file of the target image using the communication unit 603.

Figure 6B:
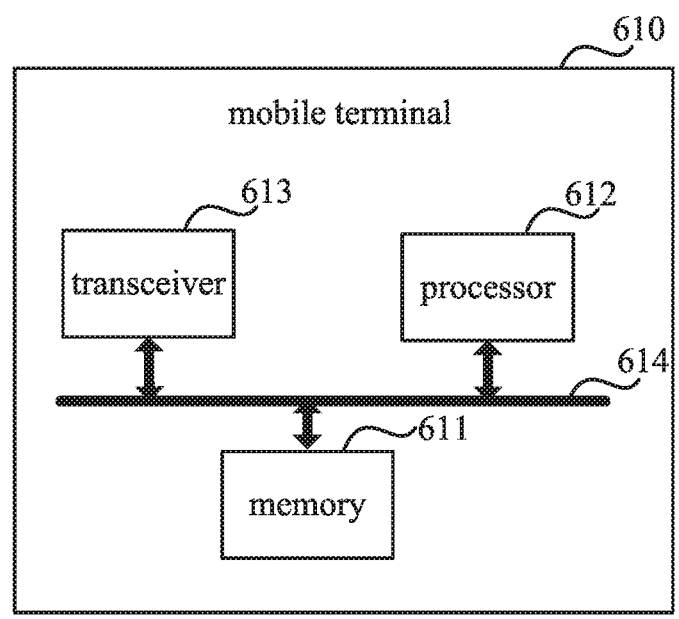
FIG. 6B illustrates a structural diagram of a mobile terminal according to another embodiment of the present disclosure.

In one embodiment, when the processing unit 602 is a processor, the communication unit 603 is a communication interface, and the storage unit 601 is a memory, the image display apparatus includes the mobile terminal in FIG. 6B.

As shown in FIG. 6B, the mobile terminal 610 includes a processor 612, a transceiver 613, and memory 611. The mobile terminal 610 further includes a bus 614. The processor 612 is connected with the transceiver 613 and the memory 611 using the bus 614. For example, the bus 614 can be a peripheral component interconnect (PCI) bus or an extended industry standard architecture (EISA) bus, and the like. The bus 614 includes an address bus, a data bus, and a control bus. In FIG. 6B, only one thick line is used to represent the bus 614, but not only one bus or one type of bus can be represented.

The image transmission apparatus in FIG. 6A can also be a device arranged in the mobile terminal.

Figure 7A:
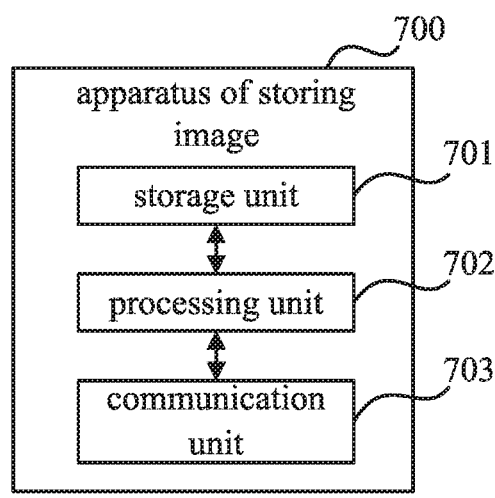
FIG. 7A illustrates a structural diagram of an apparatus of storing images according to one embodiment of the present disclosure.

If integration units are used, FIG. 7A illustrates a structural diagram of an apparatus of storing images according to one embodiment of the present disclosure. The apparatus 700 of transmitting images includes a processing unit 702 and a communication unit 703. The processing unit 702 is configured to control actions of the image storage apparatus 700. For example, the processing unit 702 is configured to support the image storage apparatus 700 that performs action blocks S101 to S102 in FIG. 2, S201 to S202 in FIG. 2, S201 to S203 in FIG. 3, and other related actions of present disclosure. The image transmission apparatus 700 further includes a storage unit 701 for storing computerized program codes and data of the image transmission apparatus 700.

In one embodiment, the processing unit 702 is a processor or a controller, and is selected from a group consisting of a central processing unit (CPU), a digital signal processor (DSP), an application specific integrated circuit (ASIC), a field programmable gate array (FPGA) or programmable logic devices, discrete gates, transistor logic devices, discrete hardware components, and the combinations. The processing unit 702 can implement various exemplary logical action blocks and circuits of the present disclosure. The processor can also be a combination for performing calculation functions, such as a combination of one or more microprocessors, a combination of a DSP and a microprocessor, and the like. The communication unit 703 is selected from a group consisting of a communication interface, a transceiver, and a transceiving circuit, where the communication interface is collectively referred to at least one interface. The storage unit 701 can be a memory.

The processing unit 702 obtains a storage file of a target image, where the storage file includes a plurality of file blocks and precision information of an image display system that is suitable for the file blocks. The processing unit 702 further stores the storage file.

Figure 7B:
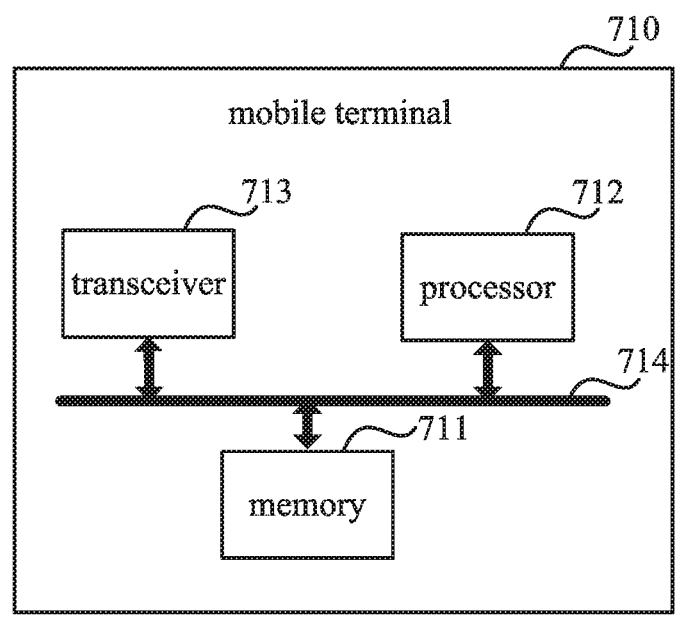
FIG. 7B illustrates a yet another structural diagram of a mobile terminal according to one embodiment of the present disclosure.

In one embodiment, when the processing unit 702 is a processor, the communication unit 703 is a communication interface, and the storage unit 701 is a memory, the image display apparatus includes the mobile terminal in FIG. 7B.

As shown in FIG. 7B, the mobile terminal 710 includes a processor 712, a transceiver 713, and memory 711. The mobile terminal 710 further includes a bus 714. The processor 712 is connected with the transceiver 713 and the memory 711 using the bus 714. For example, the bus 714 can be a peripheral component interconnect (PCI) bus or an extended industry standard architecture (EISA) bus, and the like. The bus 714 includes an address bus, a data bus, and a control bus. In FIG. 7B, only one thick line is used to represent the bus 714, but not only one bus or one type of bus can be represented.

The image transmission apparatus in FIG. 7A can also be a device arranged in the mobile terminal.

Figure 8:
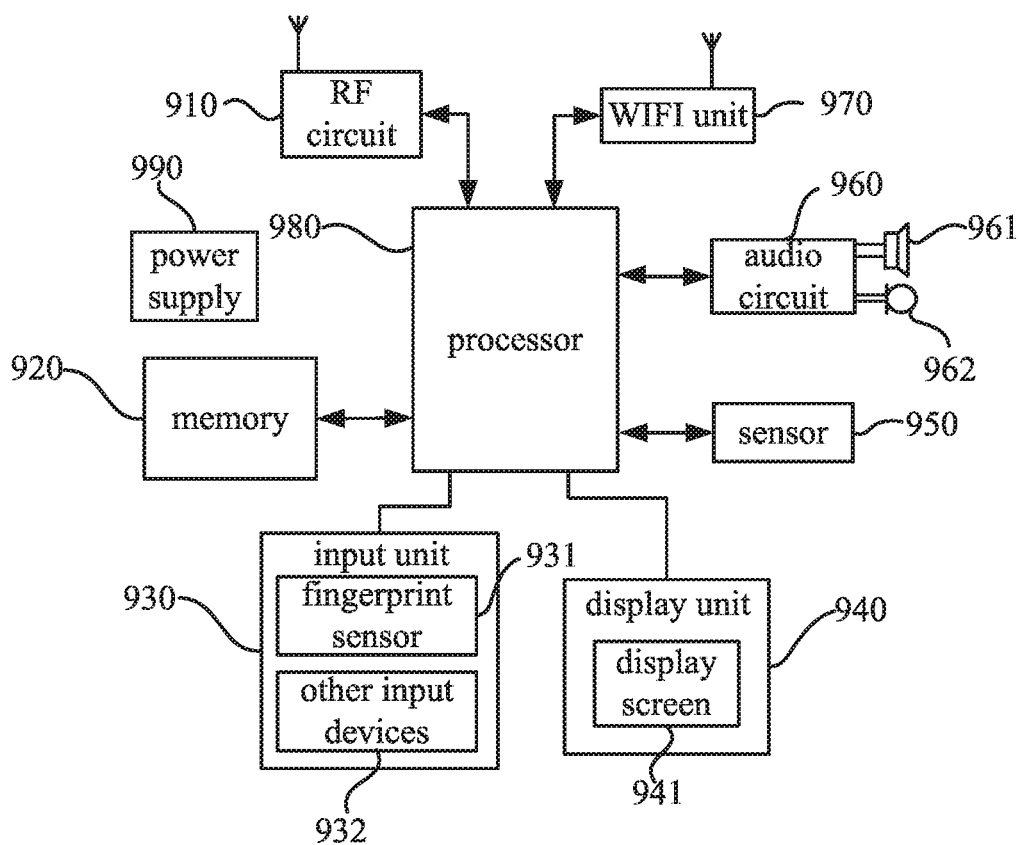
FIG. 8 illustrates a yet another structural diagram of a mobile terminal according to another embodiment of the present disclosure.

An embodiment of the present disclosure further provides another mobile terminal. As shown in FIG. 8, in order to conveniently illustrate the mobile terminal, only related part to the embodiment is shown. According to the technical details, the method of the embodiments in the present disclosure can be referred. The mobile terminal can be a mobile phone, a tablet computer, a personal digital assistant (PDA), a point of sales (POS, i.e., a sale terminal), a vehicle-mounted computer and the like. For example, the mobile terminal is regarded as a mobile phone.

FIG. 8 illustrates a yet another structural diagram of a mobile terminal (e.g. a mobile phone) according to another embodiment of the present disclosure. In FIG. 8, the mobile phone includes a radio frequency (RF) circuit 910, a memory 920, an input unit 930, a display unit 940, a sensor 950, an audio circuit 960, a wireless fidelity (WIFI) unit 970, a processor 980, and a power supply 990. Persons skilled in the art should be noted that the mobile phone in FIG. 8 is not limited to these components. More or fewer components can be included or a part of components can be combined, or different components can be arranged.

The various components of the mobile phone is described below with reference to FIG. 8.

The RF circuit 910 is used for information reception and transmission. Generally, the RF circuit 910 includes, but is not limited to, an antenna, at least one amplifier, a transceiver, and a coupler, a low noise amplifier, a duplexer, and the like. The RF circuit 910 can also communicate with other devices using a wireless communication and a network. The wireless communication is compatible with any communication standards or protocols selected from a group consisting of a global system of mobile communication (GSM) protocol, a general packet radio service (GPRS) protocol, a code division multiple access (CDMA) protocol, a wideband code division multiple access (WCDMA) protocol, a long term evolution (LTE) protocol, e-mail, a short messaging service (SMS) protocol, and the like.

The memory 920 can be used for storing software programs and instructions, and the processor 980 is used for executing software programs and instructions stored in the memory 920, so that various functional applications and data processing of the mobile phone are executed. The memory 920 includes a program storage region and a data storage region. The storage program area can store an operating system and an application program required by at least one functional unit. The data storage region can store data generated by operations of the mobile phone (such as application parameters of the application). For example, the memory 920 is selected from a group consisting of a high-speed random access memory, and a non-volatile memory, where the non-volatile memory can be at least one magnetic disk storage device, a flash memory, or volatile solid-state memory devices.

The input unit 930 can be configured to receive input digits or character information, and generate key signal inputs related to user setting and function control of the mobile phone. In one embodiment, the input unit 930 includes a fingerprint sensor 931 and other input devices 932. The fingerprint sensor 931 acquires fingerprint data of the user on the mobile phone. In addition to the fingerprint sensor 931, the input unit 930 further includes input devices 932. The input devices 932 include, but are not limited to, a touch screen, a physical button, a function key (e.g., a volume control key, or a switch key), a trackball, a mouse, an operation rod, and the combinations.

The display unit 940 can be used for displaying information inputs by a user or information provided to the user and various menus of the mobile phone. The display unit 940 includes a display screen 941, such as a liquid crystal display (LCD), or an organic light-emitting diode (OLED). The fingerprint sensor 931 and the display screen 941 serve as two independent components to perform the input operations and input functions of the mobile phone. The fingerprint sensor 931 can be integrated with the display screen 941, so that input and playing functions of the mobile phone can be implemented.

The mobile phone includes at least one sensor 950, such as a light sensor, a motion sensor, and other sensors. For example, the light sensor includes an ambient light sensor and a proximity sensor, where the ambient light sensor adjusts brightness of the display screen 941 according to the brightness of ambient light, and the proximity sensor turns off the display screen 941 and the backlight when the mobile phone moves to the ear. If one of the motion sensors is an accelerometer sensor, the accelerometer sensor detects all directions (e.g., directions along three axes), and a magnitude and a direction of gravity can be detected by the accelerometer sensor during the static state of the mobile terminal. The motion sensors can be used for recognizing applications (e.g., vertical screen switch, related games and magnetometer attitude calibrations, of mobile phone gestures), and a vibration identification correlation function (e.g., a pedometer or a tap). In one embodiment, a gyroscope, a pressure gauge, a hygrometer, a thermometer, an infrared sensor can be installed with the mobile phone.

The audio circuit 960, a loudspeaker 961, and a microphone 962 serve as an audio interface between a user and the mobile phone. The audio circuit 960 converts received audio data into electrical signals, and the loudspeaker 961 converts the electrical signals into a sound signal to be played. The microphone 962 acquires and converts sound signals into electric signals, and the audio circuit 960 converts electric signals of the microphone 962 into audio data. The processor 980 processes the audio data and transmits the processed audio data to other mobile phone using the RF circuit 910, or stores the audio data to the memory 920 for further processing.

Since WIFI is a short distance wireless transmission technology, a mobile phone can help a user to transmit and receive e-mails using the WIFI unit 970, browse the webpage, access the stream media, and provide wireless broadband internet access for the user. It should be noted that the WIFI unit 970 is not a necessity of the mobile phone, and can be omitted without changing the scope of the present disclosure.

The processor 980 is a control center of the mobile phone, and various interfaces and circuits are used for connecting all parts of the mobile phone. By executing the software programs and instructions stored in the memory 920, and accessing the data stored in the memory 920, the mobile phone executes various functions and processing data of the mobile phone, such that the processor 980 performs overall monitoring procedure on the mobile phone.

For example, the processor 980 includes at least one processing unit. The processor 980 can be integrated with an application processor and a modulation and demodulation processor, where the application processor is used for processing an operating system, a user interface, and an application program, and the modulation and demodulation processor is used for processing wireless communication. It should be noted that the modulation and demodulation processor may not be integrated into the processor 980.

The mobile phone further includes a power supply 990 (e.g., a battery) for supplying power to all the components. The power supply 990 can be logically connected with the processor 980 using a power management system, so that the management functions of charging discharging, and power consumption are achieved by the power management system.

In one embodiment, the mobile phone further includes a camera and a BLUETOOTH unit, and is not further described herein.

In the embodiments of FIGS. 1-3, the action blocks can be implemented based on the mobile phone.

In the embodiments of FIG. 5A, FIG. 6A, and FIG. 7A the functional units can be implemented based on the mobile phone.

The present disclosure further provides a computer readable storage medium, where the computer readable storage medium stores executable program instructions. When the executable program instructions are executed, the abovementioned embodiments of the present disclosure include a part or all of action blocks in the method of processing images that includes an image display method, an image transmission method, or an image storage file.

It should be understood that in various embodiments of the present disclosure, the sequence numbers of all the processes do not imply the execution sequence. The execution sequence of each process should be determined by the function and the internal logic of the process, and does not need to be limited by the implementation process of the embodiment of the present disclosure.

For example, the apparatus embodiments described above are merely exemplary. The division of the unit is only one logical function division, and in actual implementation, another division mode can be achieved. For example, a plurality of units or components may be combined or may be integrated into another system. A portion of features can be ignored or not executed. A mutual coupling or a direct coupling or communication connection can be achieved by interfaces. An indirect coupling or communication connection direct between device and units can be in an electrical, mechanical or other manner.

The units illustrated as separate components can be or cannot be physically separate. The component displayed as a unit can be or cannot be a physical unit. In other words, the component can be located in a place or distributed to a plurality of networks. Based on actual requirement, a part or all of the units can be selected to achieve the purpose of the scheme of the embodiments.

If the functional unit is implemented in the form of a software functional unit and sold or used as an independent product, the functional unit can be stored in a computer readable storage medium. Based on such understanding, the technical scheme of the present disclosure is essentially the part which makes contributions to the related art or the part of the technical scheme and can be embodied in the form of computer software products. The computer software products are stored in a storage medium, and include a plurality of executable program instructions for enabling a computer device, such as a personal computer, a server, or network equipment, to execute all or part of the actions of the method disclosed by the embodiment of the present disclosure. The storage medium includes a USB flash disk, a mobile hard disk, ROM, RAM, a magnetic disk or an optical disk, and other media capable of storing program codes.

As is understood by a person skilled in the art, the foregoing preferred embodiments of the present disclosure are illustrative rather than limiting of the present disclosure. It is intended that they cover various modifications and similar arrangements be included within the spirit and scope of the present disclosure, the scope of which should be accorded the broadest interpretation so as to encompass all such modifications and similar structures.

What is claimed is:

1. A method of displaying images, comprising:
    obtaining a storage file of a target image, wherein the storage file comprises a plurality of file blocks and precision information of an image display system that is suitable for the file blocks; wherein each of the plurality of file blocks stores data information of the same target image at a different precision from those of other ones of the plurality of file blocks;
    obtaining reference precision of the image display system for determining that at least one file block is suitable for the reference precision in the storage file; and
    displaying the target image, on a display unit, according to the at least one determined file block;
    wherein the file blocks comprise at least one first file block and a second file block, the first file block is suitable for the image display system having a first precision, the second file block is suitable for the image display system having a second precision, the second precision is better than the first precision, the at least one first file block is followed by the second file block, and the second file block comprises at least one mark code and compression data;
    wherein the compression data in the second file block are high-precision information of compression data in the first file block; wherein the high-precision information comprises a plurality of data segments, and each of the data segments comprises relative brightness data or relative chromaticity data of pixels, the relative brightness data is a relative value of brightness of adjacent pixels, and the relative chromaticity data is a relative value of chromaticity of adjacent pixels.

2. The method of displaying images according to claim 1, wherein the at least one mark code of the second file block is selected from a group consisting of mark codes SOI, EOI, App0-15, DQT, DHT, SOF, SOC, DRI, and SONI; and
    wherein the mark code SONI is represented by a code 0xFFD7;
    wherein SOI represents a start point of image data, EOI represents an end point of the image data, App0-15 represent information of lengths of the image data and a number of pixels, DQT represents a quantization table of the image data, DHT represents a Huffman coding table of the image data, SOF represents a start point of a frame of the image data, SOC represents a start point of a scan procedure of the image data, DRI represents a differential coding accumulative reset of the image data, and SONI represents a start of new image.

3. The method of displaying images according to claim 1, wherein the first file block in the file blocks is a joint photographic experts group (JPEG) image file, and the first file block is suitable for the image display system having an 8-bit width.

4. The method of displaying images according to claim 1, wherein the precision information is defined as a bit width of data of the file blocks suitable for being processed by the image display system, the data in the file blocks are used for storing and displaying brightness and color information of images, and a larger bit width corresponds to better quality of the images, and the reference precision is defined as a preset bit width of the image display system.

5. An apparatus for displaying images, comprising:
    a processor;
    a communication unit coupled to the processor; and
    a memory coupled with the processor and the communication unit, wherein the memory comprises program instructions executable by the processor, the program instructions comprising:
    obtaining a storage file of a target image using the communication unit, wherein the storage file comprises a plurality of file blocks and precision information of an image display system that is suitable for the file blocks; wherein each of the plurality of file blocks stores data information of the same target image at a different precision from those of other ones of the plurality of file blocks;
    obtaining reference precision of the image display system for determining that at least one file block is suitable for the reference precision in the storage file; and
    displaying the target image, on a display unit, according to the at least one determined file block;
    wherein the file blocks comprise at least one first file block and a second file block, the first file block is suitable for the image display system having a first precision, the second file block is suitable for the image display system having a second precision, the second precision is better than the first precision, the at least one first file block is followed by the second file block, and the second file block comprises at least one mark code and compression data;
    wherein the compression data in the second file block are high-precision information of compression data in the first file block; wherein the high-precision information comprises a plurality of data segments, and each of the data segments comprises relative brightness data or relative chromaticity data of pixels, the relative brightness data is a relative value of brightness of adjacent pixels, and the relative chromaticity data is a relative value of chromaticity of adjacent pixels.

6. The apparatus according to claim 5, wherein the at least one mark code of the second file block is selected from a group consisting of mark codes SOI, EOI, App0-15, DQT, DHT, SOF, SOC, DRI, and SONI; and
wherein the mark code SONI is represented by a code 0xFFD7;
wherein SOI represents a start point of image data, EOI represents an end point of the image data, App0-15 represent information of lengths of the image data and a number of pixels, DQT represents a quantization table of the image data, DHT represents a Huffman coding table of the image data, SOF represents a start point of a frame of the image data, SOC represents a start point of a scan procedure of the image data, DRI represents a differential coding accumulative reset of the image data, and SONI represents a start of new image.

7. The apparatus according to claim 5, wherein the first file block in the file blocks is a joint photographic experts group (JPEG) image file, and the first file block is suitable for the image display system having an 8-bit width.

8. The apparatus according to claim 5, wherein the precision information is defined as a bit width of data of the file blocks suitable for being processed by the image display system, the data in the file blocks are used for storing and displaying brightness and color information of images, and a larger bit width corresponds to better quality of the images, and the reference precision is defined as a preset bit width of the image display system.

9. A mobile terminal, comprising:
a processor;
a transceiver;
a memory; and
a bus coupled to the transceiver and the memory;
wherein the processor is coupled to the transceiver and the memory using the bus, and the memory comprises program instructions executable by the processor, the program instructions comprising:
obtaining a storage file of a target image using the transceiver, wherein the storage file comprises a plurality of file blocks and precision information of an image display system that is suitable for the file blocks; wherein each of the plurality of file blocks stores data information of the same target image at a different precision from those of other ones of the plurality of file blocks;
obtaining reference precision of the image display system for determining that at least one file block is suitable for the reference precision in the storage file; and
displaying the target image, on a display unit, according to the at least one determined file block;
wherein the file blocks comprise at least one first file block and a second file block, the first file block is suitable for the image display system having a first precision, the second file block is suitable for the image display system having a second precision, the second precision is better than the first precision, the at least one first file block is followed by the second file block, and the second file block comprises at least one mark code and compression data;
wherein the compression data in the second file block are high-precision information of compression data in the first file block; wherein the high-precision information comprises a plurality of data segments, and each of the data segments comprises relative brightness data or relative chromaticity data of pixels, the relative brightness data is a relative value of brightness of adjacent pixels, and the relative chromaticity data is a relative value of chromaticity of adjacent pixels.

10. The mobile terminal according to claim 9, wherein the at least one mark code of the second file block is selected from a group consisting of mark codes SOI, EOI, App0-15, DQT, DHT, SOF, SOC, DRI, and SONI; and
wherein the mark code SONI is represented by a code 0xFFD7;
wherein SOI represents a start point of image data, EOI represents an end point of the image data, App0-15 represent information of lengths of the image data and a number of pixels, DQT represents a quantization table of the image data, DHT represents a Huffman coding table of the image data, SOF represents a start point of a frame of the image data, SOC represents a start point of a scan procedure of the image data, DRI represents a differential coding accumulative reset of the image data, and SONI represents a start of new image.

11. The mobile terminal according to claim 9, wherein the first file block in the file blocks is a joint photographic experts group (JPEG) image file, and the first file block is suitable for the image display system having an 8-bit width.

12. The mobile terminal according to claim 9, wherein the precision information is defined as a bit width of data of the file blocks suitable for being processed by the image display system, the data in the file blocks are used for storing and displaying brightness and color information of images, and a larger bit width corresponds to better quality of the images, and the reference precision is defined as a preset bit width of the image display system.

* * * * *